United States Patent Office 3,488,164
Patented Jan. 6, 1970

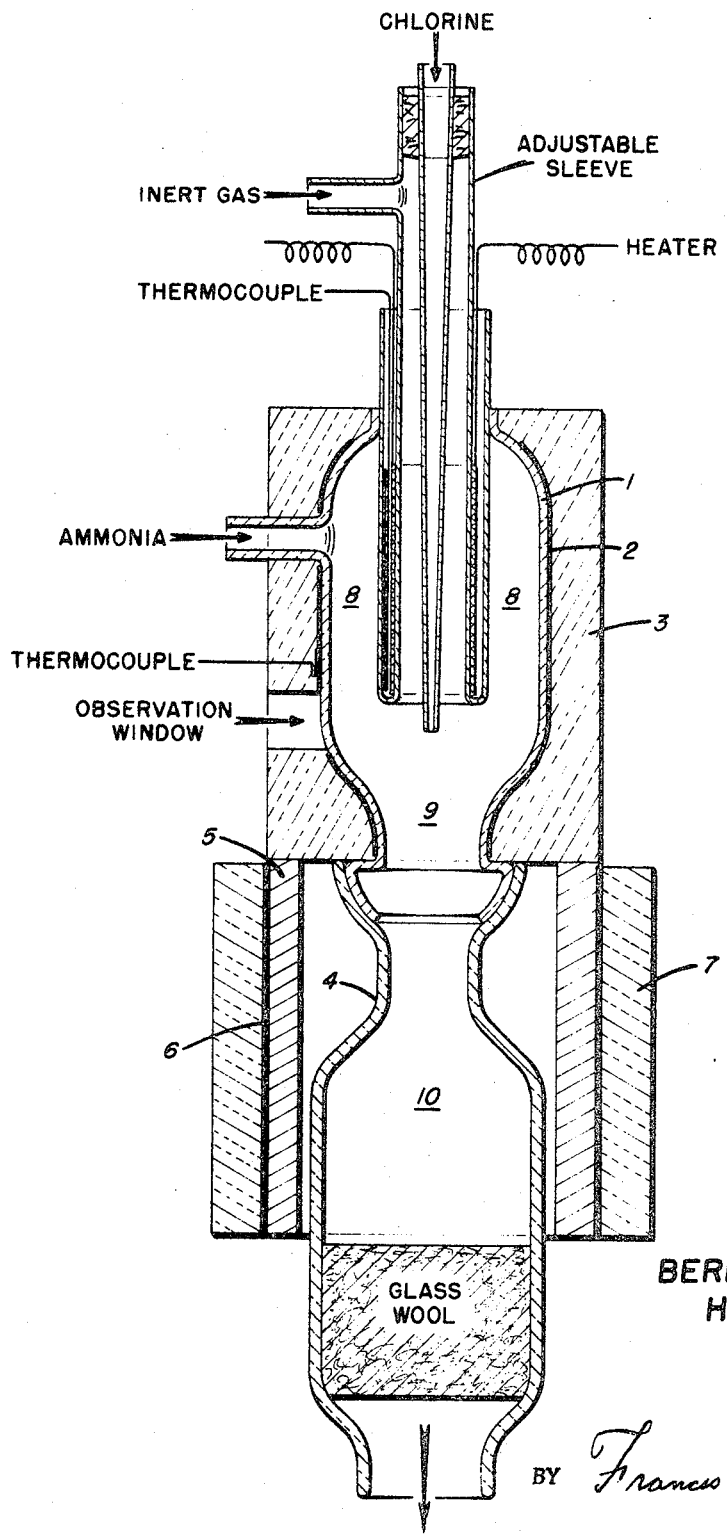

3,488,164
PROCESS FOR PREPARING CHLORAMINE
Bernard Grushkin, Silver Spring, Md., and Harry H. Sisler, Gainesville, Fla., assignors to W. R. Grace & Co., New York, N.Y., a corporation of Connecticut
Filed Apr. 26, 1967, Ser. No. 633,971
Int. Cl. C01b 21/18; C01c 1/16
U.S. Cl. 23—356     3 Claims

ABSTRACT OF THE DISCLOSURE

Chloramine is continuously prepared in the gaseous phase by reacting one molar proportion of chlorine with at least about 1.9 molar proportion of ammonia in the presence of at least about 1 molar proportion of an inert diluent gas at a temperature of at least about 250° C.

---

The present invention relates to a novel and useful process for forming chloramine. More particularly, it relates to a process for forming chloramine by the reaction of ammonia and chlorine.

It is known in the art that chlorine and ammonia may be reacted to form chloramine according to the following equation:

$$2NH_3 + Cl_2 \rightarrow NH_2Cl + NH_4Cl$$

Since the reaction is exothermic, elevated temperatures of from about 100° C. to about 150° C., have generally been employed for the reaction. At such temperatures, the formation of ammonium chloride is proportionally quite high and an accumulation of ammonium chloride in the reactor generally requires a shut down at frequent intervals for cleaning. Also, in order to obtain yields of about 80% or more the mole ratio of ammonia to chlorine was required to be in excess of 11. It has now been found that by modifying the reaction conditions and mole ratios, excellent yields may be obtained without the fouling of the reactor with ammonia chloride.

Accordingly, it is an object of the present invention to provide a continuous process for the manufacture of chloramine. Another object is to provide a process which gives chloramine in high yields. A still further object is to provide a process which can operate continuously with little or no fouling of the reactor. Other objects will become apparent as the description of the invention proceeds.

These objects are accomplished by the present invention which provides a process for forming chloramine which comprises continuously reacting in the gaseous phase one molar proportion of chloramine with at least about 1.9 molar proportions of ammonia in the presence of at least about 1 molar proportion of an inert diluent gas at a temperature of at least about 250° C. and thereafter recovering the chloramine.

In a preferred embodiment of the present invention, the ammonia to chlorine ratio is maintained of from about 2 to about 10, more preferably 2 to 5. In the preferred embodiment, the reaction is carried out at a temperature of from about 275° C. to about 700° C., preferably from about 290° C. to about 350° C.

In a still more preferred embodiment of the present invention, the gaseous reaction products are maintained at a temperature of from about 50 to about 250° C. until at least a portion of the ammonium chloride is solidified. The solids are removed and thereafter the gaseous chloramine is recovered, preferably in a solvent such as diethyl ether.

The invention will now be more specifically described by reference to the following examples in which parts are given on a molar basis unless otherwise indicated.

In carrying out the examples the reactor described in the drawing is utilized. For convenience, many parts of the reactor are labeled rather than numbered. The reactor consists of three zones, an entrance zone 8, a reaction zone 9 and a cooling zone 10. The chlorine gas is fed through the middle tube of the top assembly and its point of entrance into the reaction zone may be adjusted by an adjustable sleeve (labeled). The inert gas, generally nitrogen, is fed through a second concentric tube which surrounds the chlorine entrance tube. Both gases are preheated by means of an electric heater (labeled) to a temperature approximating the reaction temperature. The temperature is measured by a thermocouple (labeled). The nitrogen gas is brought into an entrance zone in the left side of the assembly by means of a port (labeled). The entrance zone 8 and the reaction zone 9 consists of an inner quartz lining 1 which is wound with an insulated heating tape 2 which is then covered by conventional insulation 3. A thermocouple (labeled) is used to observe the temperature within the inner quartz lining 1. By regulating the amount of current through the heating tape 2, the temperature within the reaction zone can be varied as desired. The cooling zone 10 consists of an inner pyrex glass liner 4 which is surrounded by a cylindrical metal holder 5. The cylindrical metal holder 5 is wrapped with a heating tape 6 which is covered by insulation 7. At the bottom of the cooling zone 10, glass wool (labeled) is inserted. In actual practice, the entrance zone 8 and reaction zone 9 are kept at the reaction temperature. In cooling zone 10, however, the temperature is maintained at a value somewhere between 50° C. and 250° C. to solidify the ammonia chloride which collects on the glass wool. The chloramine then proceeds out of the cooling zone where it collected in the solvent diethyl ether. In the examples, the cooling zone is maintained at a temperature of about 75° C. The chloramine is analyzed by a conventional procedure from the diethyl ether solution.

EXAMPLES 1 TO 6

The above described reactor is employed to form chloramine under the conditions given below. In the actual reactor employed, the widest portion of the entrance zone is approximately 50 millimeter in diameter, the entrance zone plus the reaction zone is about 10″ in length, the chlorine entrance tube has a diameter of about ½ millimeters, the concentric inert gas tube (in this case nitrogen) has a diameter of about 2 millimeters and the total length of the cooling tube is approximately 15″. The mole ratios and temperature are given in the table below.

REACTION OF $Cl_2$ AND $NH_3$

| Experiment No. | Mole ratio $Cl_2/NH_3/N_2$ | Moles $Cl_2$/min. | Temp. of cooling zone (glass wool); ° C. | Temp. of entrance zone and reaction zone, ° C. | Yield of $NH_2Cl$, percent |
|---|---|---|---|---|---|
| 1 | 1/2.04/12.73 | 1.02 | 75 | 300 | 94 |
| 2 | 1/2.10/8.00 | 1.00 | 75 | 300 | 90 |
| 3 | 1/2.10/3.29 | 0.86 | 75 | 300 | 89 |
| 4 | 1/13.2/2.49 | 0.93 | 75 | 300 | 87 |
| 5 | 1/2.06/11.19 | 0.95 | 75 | 300 | 94 |
| 6 | 1/3.48/12.80 | 0.789 | 75 | 300 | 91 |

EXAMPLES 7 AND 8

The procedure of Example 1 is repeated keeping all conditions the same with the exception that the reaction zone employs a temperature of 475° C. in one case and 600° C. in the second case. Substantially the same yields are obtained as in Example 1.

While in the above example nitrogen is employed as the inert diluent gas, any gas may be employed which does not react with the components in the reactor. For example, argon, neon, carbon dioxide, helium, krypton as well as other gases may be used in place of the nitrogen. Also, solvents other than diethyl ether may be used to collect the chloramine. For example, toluene, benzene, chlorobenzene and the like may also be employed.

In reacting the gaseous components, it is preferred that the ammonia and nitrogen be premixed and the chlorine fed into the mixture at substantially atmospheric pressure. This procedure allows the reaction to be easily controlled particularly when used with the reactor shown in the drawings. However, lower or higher pressures may also be used if desired.

Many equivalent modifications will be apparent to those skilled in the art from a reading of the foregoing without a departure from the inventive concept.

What is claimed is:
1. A process for forming chloramine which comprises:
   (A) continuously reacting in the gaseous phase one molar proportion of chlorine with 2 to 5 molar proportions of ammonia in the presence of at least about 1 molar proportion of an inert diluent gas at a temperature of from about 275° C. to about 700° C.;
   (B) maintaining the gaseous reaction products at a temperature from about 50 to about 250° C. until at least a portion of ammonium chloride therein is solidified;
   (C) removing the solidified portion; and
   (D) recovering gaseous chloramine.
2. The process of claim 1 wherein the reaction is carried out at a temperature of from about 290° C. to about 350° C.
3. The process of claim 1 wherein the gaseous reactants and inert diluent gas are preheated to a temperature approximating the reaction temperature.

References Cited

UNITED STATES PATENTS

| | | | |
|---|---|---|---|
| 2,739,043 | 3/1956 | Dexter | 23—100 |
| 2,837,409 | 6/1958 | Sisler et al. | 23—100 |

OSCAR R. VERTIZ, Primary Examiner

H. S. MILLER, Assistant Examiner

U.S. Cl. X.R.

23—100, 284